(12) United States Patent
Hashimoto

(10) Patent No.: US 11,562,154 B2
(45) Date of Patent: Jan. 24, 2023

(54) INFORMATION PROCESSING APPARATUS, PRINT SYSTEM, AND INFORMATION PROCESSING METHOD

(71) Applicant: CANON KABUSHIKI KAISHA, Tokyo (JP)

(72) Inventor: Yoshinori Hashimoto, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/177,533

(22) Filed: Feb. 17, 2021

(65) Prior Publication Data

US 2021/0271829 A1 Sep. 2, 2021

(30) Foreign Application Priority Data

Feb. 28, 2020 (JP) .............................. JP2020-033748

(51) Int. Cl.
| | |
|---|---|
| *G06K 5/00* | (2006.01) |
| *G06K 5/02* | (2006.01) |
| *G06K 7/14* | (2006.01) |
| *H04N 1/00* | (2006.01) |

(52) U.S. Cl.
CPC ............ *G06K 5/02* (2013.01); *G06K 7/1469* (2013.01); *G06K 7/1473* (2013.01); *H04N 1/00334* (2013.01)

(58) Field of Classification Search
CPC ...... G06K 5/02; G06K 7/1469; G06K 7/1473; H04N 1/00334
USPC ............................................ 235/462.01, 494
See application file for complete search history.

(56) References Cited

U.S. PATENT DOCUMENTS

| | | | | |
|---|---|---|---|---|
| 2005/0012949 | A1* | 1/2005 | Kitahara | ................ G06K 1/121 358/1.11 |
| 2007/0176000 | A1* | 8/2007 | Cattrone | ................ G06K 1/121 235/462.01 |
| 2008/0037891 | A1* | 2/2008 | Koyatsu | ............... G06V 10/993 382/254 |
| 2008/0203177 | A1* | 8/2008 | Yumoto | ................ G06K 1/121 235/494 |
| 2008/0304891 | A1* | 12/2008 | Saijo | ...................... G06K 1/121 400/76 |
| 2012/0118948 | A1* | 5/2012 | Cheng | ...................... G06K 5/00 235/375 |
| 2018/0276515 | A1* | 9/2018 | Huang | ............. G06K 19/06037 |

(Continued)

FOREIGN PATENT DOCUMENTS

JP 2016-127552 A 7/2016

*Primary Examiner* — Tuyen K Vo
(74) *Attorney, Agent, or Firm* — Venable LLP

(57) ABSTRACT

An information processing apparatus operates to acquire first information concerning a size of a print region where a barcode is printed, to generate, based on the acquired first information, image data of the barcode to be printed in the print region, and to set a lower limit of the width of each bar forming the barcode. The first information includes width information concerning a width of the print region and height information concerning a height of the print region. The generated image data includes, as a bar forming the barcode, a bar having a width based on the width information and a height based on the height information, and the image data is generated if a minimum width of each bar forming the barcode is equal to or larger than the set lower limit.

11 Claims, 15 Drawing Sheets

(56) References Cited

U.S. PATENT DOCUMENTS

2019/0068808 A1\* 2/2019 Nakamura ............ G06F 3/1202
2019/0213361 A1\* 7/2019 Ackley .............. H04N 1/32144

\* cited by examiner

FIG. 8

| CODE | PATTERN | BAR PATTERN |
|---|---|---|
| 0 | 10011101100 | |
| 1 | 10011100110 | |
| 2 | 11001110010 | |
| 3 | 11001011100 | |
| 4 | 11001001110 | |
| 5 | 11011100100 | |
| . | | |
| . | | |
| . | | |
| START | 11010010000 | |
| STOP | 11000111010011 | |

(※IN ADDITION, CODES REPRESENTING NUMBERS AND ALPHABETS ARE PROVIDED)

FIG. 14

| PRINTER | QUALITY SETTING | PRINT RESOLUTION [dpi] |
|---|---|---|
| P1 | FINE | 2400 |
| | STANDARD | 1200 |
| P2 | FINE | 600 |
| | STANDARD | 300 |
| . | . | . |
| . | . | . |
| . | . | . |

FIG. 15

| BARCODE READER | RESOLUTION [mm] | PRINT RESOLUTION OF PRINTER [dpi] | LOWER LIMIT OF BAR WIDTH [pixel] |
|---|---|---|---|
| R1 | 0.076 | 1200 | 4 |
| | | 600 | 2 |
| | | 300 | 1 |
| R2 | 0.100 | 1200 | 5 |
| | | 600 | 3 |
| | | 300 | 2 |
| R3 | 0.127 | 1200 | 6 |
| | | 600 | 3 |
| | | 300 | 2 |
| × | × | ○ | × |
| × | × | ○ | × |
| × | × | ○ | × |

FIG. 16

| PAPER | BARCODE FONT | LOWER LIMIT OF BAR WIDTH [pixel] |
|---|---|---|
| THIN PAPER | CODE128 | 8 |
| | CODE39 | 6 |
| | ¤ | ¤ |
| PLAIN PAPER | CODE128 | 6 |
| | CODE39 | 4 |
| | ¤ | ¤ |
| COATED PAPER | CODE128 | 4 |
| | CODE39 | 2 |
| | ¤ | ¤ |
| ¤ | ¤ | ¤ |
| ¤ | ¤ | ¤ |
| ¤ | ¤ | ¤ |

INFORMATION PROCESSING APPARATUS, PRINT SYSTEM, AND INFORMATION PROCESSING METHOD

BACKGROUND OF THE INVENTION

Field of the Invention

The present invention relates to an information processing apparatus, a print system, and an information processing method.

Description of the Related Art

Conventionally, a barcode has been used to manage a manufacturing process in a factory or to identify a product. In printing a barcode, the barcode may be printed in a size considering the reading accuracy of a barcode reader, a restriction on the layout of a printed product, and the like. Japanese Patent Laid-Open No. 2016-127552 discloses a technique of printing a barcode by setting the font size [pt] of the barcode so as to fall within a designated print region.

SUMMARY OF THE INVENTION

According to one embodiment of the present invention, there is provided an information processing apparatus comprising: a first acquisition unit configured to acquire first information concerning a size of a print region where a barcode is printed; and a generation unit configured to generate, based on the first information acquired by the first acquisition unit, image data of the barcode to be printed in the print region, wherein the first information includes width information concerning a width of the print region and height information concerning a height of the print region, and the generation unit generates the image data including, as a bar forming the barcode, a bar having a width based on the width information and a height based on the height information.

According to another embodiment of the present invention, there is provided a print system comprising: a first acquisition unit configured to acquire first information concerning a size of a print region where a barcode is printed; a generation unit configured to generate, based on the first information acquired by the first acquisition unit, image data of the barcode to be printed in the print region; and a print unit configured to execute printing based on the image data generated by the generation unit, wherein the first information includes width information concerning a width of the print region and height information concerning a height of the print region, and the generation unit generates the image data including, as a bar forming the barcode, a bar having a width based on the width information and a height based on the height information.

According to still another embodiment of the present invention, there is provided an information processing method comprising: acquiring first information concerning a size of a print region where a barcode is printed; and generating, based on the first information acquired in the acquiring, image data of the barcode to be printed in the print region, wherein the first information includes width information concerning a width of the print region and height information concerning a height of the print region, and in the generating, the image data including, as a bar forming the barcode, a bar having a width based on the width information and a height based on the height information is generated.

Further features of the present invention will become apparent from the following description of exemplary embodiments (with reference to the attached drawings).

BRIEF DESCRIPTION OF THE DRAWINGS

FIG. 8 is a view for explaining examples of barcode patterns;

FIG. 14 is a table showing an example of a printer information DB;

FIG. 15 is a table showing an example of a barcode reader information DB;

FIG. 16 is a table showing an example of a paper information DB;

DESCRIPTION OF THE EMBODIMENTS

Figure 17A:
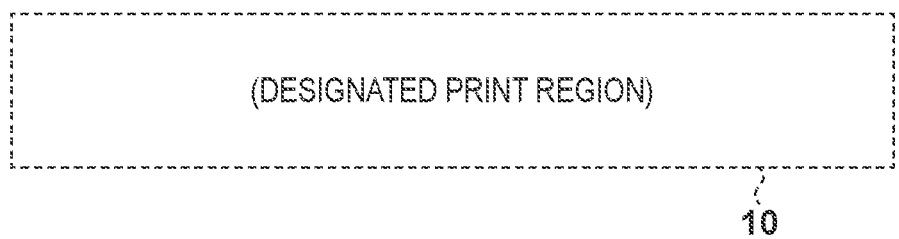
FIG. 17A is a schematic view showing the relationship between a designated print region and the size of a barcode when printing the barcode within the designated print region by changing a font size.
Figure 17B:
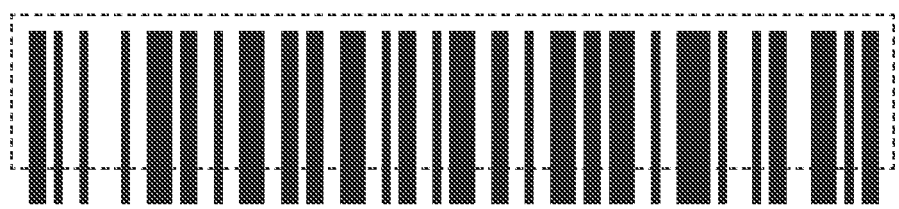
FIG. 17B is a schematic view showing the relationship between the designated print region and the size of the barcode when printing the barcode within the designated print region by changing the font size.
Figure 17C:
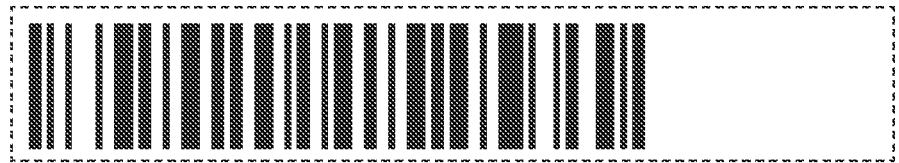
FIG. 17C is a schematic view showing the relationship between the designated print region and the size of the barcode when printing the barcode within the designated print region by changing the font size.

In the above-described conventional technique, when changing the size of a barcode, the barcode is enlarged or reduced while keeping the aspect ratio of the barcode. FIG. 17A to 17C are schematic views each showing the relationship between a designated print region and the size of the barcode when printing the barcode within the designated print region by changing a font size. When an attempt is made to print the barcode by making the width of the barcode match the designated print region shown in FIG. 17A, the height of the barcode may not fall within the designated print region, as shown in FIG. 17B. In this case, if the barcode is printed by making the height of the barcode match the designated print region, as shown in FIG. 17C, the width of each of bars forming the barcode and the intervals between the bars become small, causing deterioration of the reading accuracy of the barcode.

Embodiments of the present invention provide a technique of printing a barcode in an appropriate size.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

System Arrangement

Figure 1:
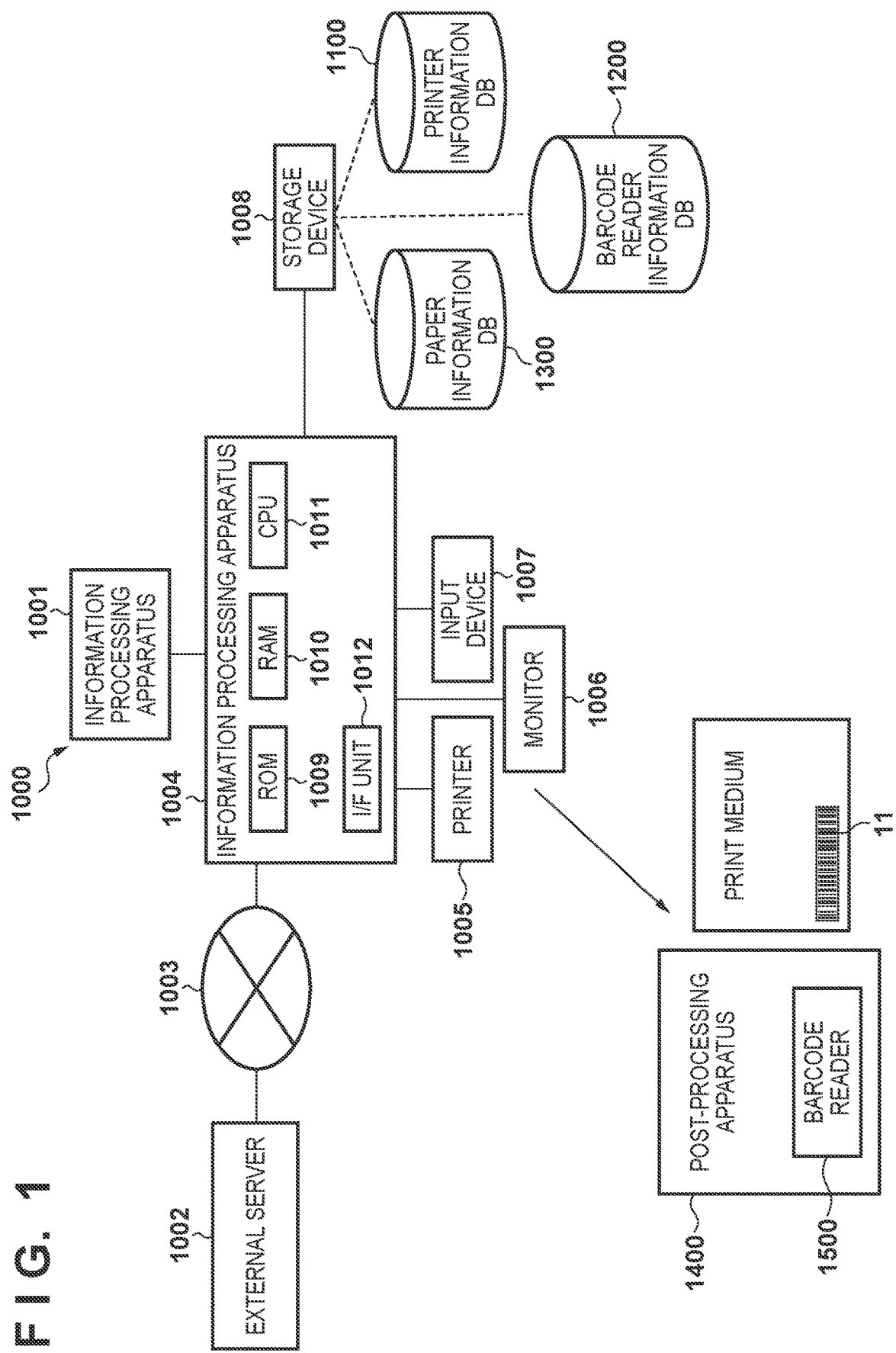
FIG. 1 is a view showing an example of the arrangement of a print system and apparatuses in the periphery of the print system according to an embodiment.

FIG. 1 is a view showing an example of the arrangement of a print system 1000 and apparatuses in the periphery of the print system 1000 according to the embodiment, and shows, as peripheral apparatuses, an information processing apparatus 1001, an external server 1002, and a post-processing apparatus 1400. The print system 1000 generates image data of a barcode, and prints the barcode based on the generated image data. For example, a barcode reader 1500 provided in the post-processing apparatus 1400 can read a barcode 11 printed by the print system 1000. The print system 1000 includes an information processing apparatus 1004, a printer 1005, a monitor 1006, an input device 1007, and a storage device 1008.

The information processing apparatus 1004 generates image data of the barcode, and outputs it to the printer 1005. In this embodiment, the information processing apparatus 1004 is connected to the printer 1005, the monitor 1006, the input device 1007, and the storage device 1008. The information processing apparatus 1004 can communicate with the external server 1002 via a network 1003. The information processing apparatus 1004 includes a ROM 1009, a RAM 1010, a CPU 1011, and an I/F unit 1012.

The CPU 1011 is a central processing unit, and controls the overall information processing apparatus 1004 by executing an operating system program (to be abbreviated as an OS hereinafter) stored in the storage device 1008, the ROM 1009, or the RAM 1010. In addition, the CPU 1011 implements the functions of the information processing apparatus 1004 by executing programs stored in the ROM 1009 or the RAM 1010. For example, the CPU 1011 generates image data of the barcode by executing a program of a barcode generation application 90 (to be described later).

The ROM 1009 stores various kinds of programs. The RAM 1010 is a random access memory, and is used as the work memory of the CPU 1011. If the RAM 1010 is a nonvolatile RAM, various kinds of programs can be stored in the RAM 1010.

The I/F unit 1012 is formed from, for example, a communication interface, an input/output interface, and the like, and relays transmission/reception of signals between the CPU 1011 and an external device, the external server 1002, or the like. For example, the CPU 1011 downloads data from the external server 1002 via the communication interface of the I/F unit 1012. Furthermore, for example, the CPU 1011 transmits/receives signals to/from the printer 1005, the monitor 1006, the input device 1007, and the storage device 1008 via the input/output interface of the I/F unit.

The printer 1005 prints on a print medium. In this embodiment, the printer 1005 prints the barcode based on the image data of the barcode 11 received from the information processing apparatus 1004. For example, the barcode 11 on a printed product printed by the printer 1005 is read by the barcode reader 1500 of the post-processing apparatus 1400, and is processed as instruction information of subsequent processing.

The monitor 1006 is a display device that displays various kinds of image information output from the information processing apparatus 1004. For example, the monitor 1006 displays printer setting information, execution information of a print job by the printer 1005, and the like, which have been received from the information processing apparatus 1004. The monitor 1006 can be a liquid crystal display. Furthermore, the monitor 1006 can be a touch panel integrated with the input device, or the like.

The input device 1007 accepts a user input to the information processing apparatus 1004. The input device 1007 can be a keyboard, a pointing device, or the like.

The storage device 1008 is a storage device such as an HDD or SSD that saves programs to be executed by the CPU 1011 and various data such as image data and templates. In this embodiment, the storage device 1008 includes memory areas of a printer information DB (database) 1100, a barcode reader information DB 1200, and a paper information DB 1300.

FIGS. 14 to 16 are tables, respectively, showing examples of the printer information DB 1100, the barcode reader information DB 1200, the paper information DB 1300 stored in the storage device 1008.

The printer information DB 1100 manages, in linkage with each other, the model of the printer 1005 and information about a quality setting selectable in each model and a print resolution in the quality setting. For example, a printer of a model P1 is provided with "fine" and "standard" as selectable quality settings. The print resolution for "fine" is 2,400 dpi, and the print resolution for "standard" is 1,200 dpi.

The barcode reader information DB 1200 manages, in linkage with each other, pieces of information about the model of the barcode reader 1500, the resolution of each model, and a lower limit of a bar width for each print resolution of each printer. For example, when a barcode reader of a model R1 has a resolution of 0.076 mm and the print resolution of the printer that prints the barcode is 1,200 dpi, the readable lower limit of the width of each bar forming the barcode is 4 pixels. The lower limit can be set to improve or maintain the reading accuracy of the barcode reader 1500.

The paper information DB 1300 manages, in linkage with each other, pieces of information about the type of paper as a print target and a barcode font and the lower limit of the bar width. For example, if paper to be used for printing is thin paper and the barcode font is CODE 128, the lower limit of the bar width is 8 pixels.

Note that information managed by each of the DBs shown in FIGS. 14 to 16 is an example, and each DB can include other information. In one embodiment, the printer information DB 1100, the barcode reader information DB 1200, and the paper information DB 1300 may be managed by the external server 1002. In this case, the information processing apparatus 1004 can acquire the information of each DB via the network 1003.

The post-processing apparatus 1400 includes the barcode reader 1500 as a reading apparatus that reads the barcode, and can execute predetermined processing in accordance with the reading result of the barcode. An example of the predetermined processing is management of the stock status of a product according to the reading result of the barcode.

Note that the arrangement of the print system 1000 shown in FIG. 1 is merely an example, and another arrangement can also be adopted. For example, the information processing apparatus 1004 may include the monitor 1006, the input device 1007, and the storage device 1008. The external server 1002 may execute part of processing executed by the information processing apparatus 1004. In other words, in one embodiment, the print system may include the external server 1002. The information processing apparatus 1004 can execute various kinds of processes such as barcode generation processing (to be described later) based on an instruction from the information processing apparatus 1001 or the external server 1002 without being limited to the user input accepted by the input device 1007.

Example of Arrangement of Barcode Generation Application

Figure 2:
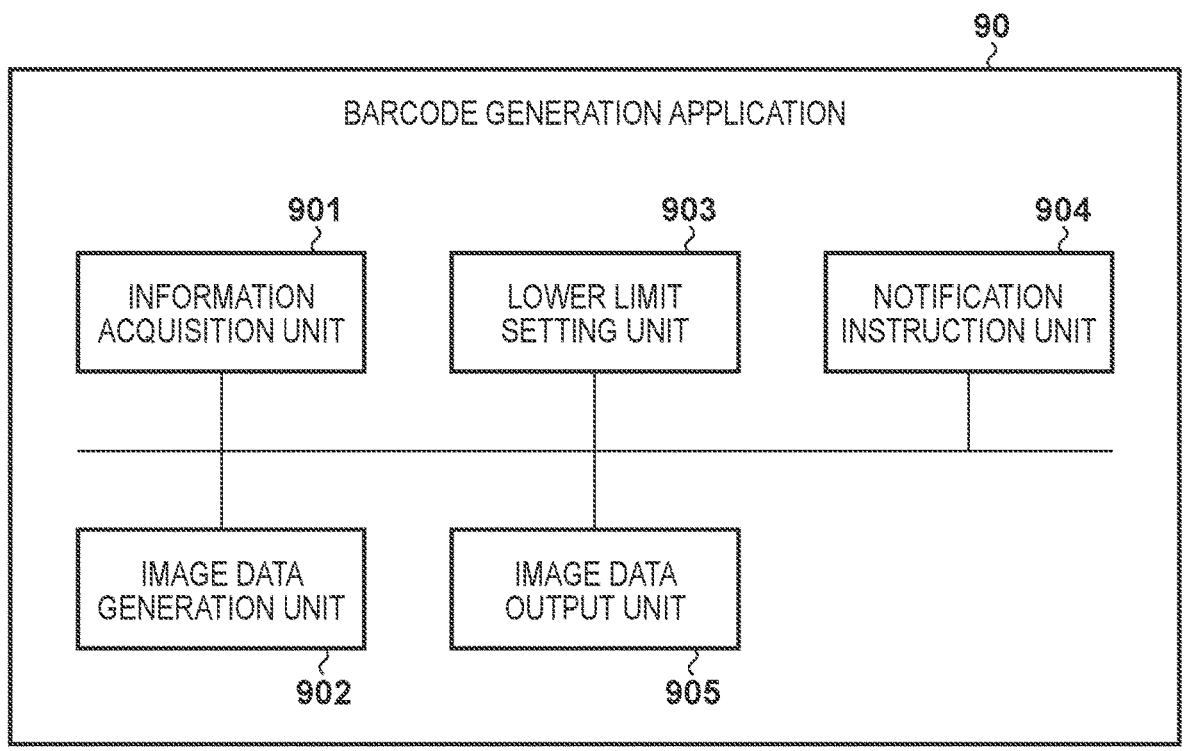
FIG. 2 is a block diagram showing an example of the software arrangement of a barcode generation application.

FIG. 2 shows an example of the software arrangement of a barcode generation application 90 (to be referred to as the application 90 hereinafter). For example, when the CPU 1011 reads out the program stored in the ROM 1009 into the RAM 1010, and executes it, each function of the application 90 is implemented.

An information acquisition unit 901 acquires various kinds of information. For example, the information acquisition unit 901 acquires arrangement information of the barcode 11 and information of the print region where the barcode 11 is to be printed. For example, the information acquisition unit 901 can acquire information about the size of the barcode 11 or the print region, more specifically, information about the entire width and height of the barcode 11 or the print region and the like. Furthermore, for example, the information acquisition unit 901 can acquire information about a lower limit L of the width of each bar forming the barcode 11. In addition, for example, the information acquisition unit 901 can acquire character string information of the type of the barcode 11, numbers or alphabets converted into the barcode 11, and the like, and information of the font size of the barcode and the like.

The information acquisition unit 901 can acquire information of the printer 1005 as the output destination of image data generated by an image data generation unit 902. In one embodiment, the information acquisition unit 901 acquires information corresponding to the type of the printer 1005 from the printer information DB 1100 managed by the storage device 1008. In addition, in one embodiment, the information acquisition unit 901 acquires current setting information, the execution status of a job, and the like from the printer 1005.

The information acquisition unit 901 acquires information of the barcode reader 1500 that reads the barcode 11 printed by the printer 1005. In one embodiment, the information acquisition unit 901 acquires information corresponding to the type of the printer 1005 from the barcode reader information DB 1200 managed by the storage device 1008. In addition, in one embodiment, the information acquisition unit 901 acquires setting information of the barcode reader 1500 and the like by communicating with the post-processing apparatus 1400.

The information acquisition unit 901 acquires information about the type of paper on which the printer 1005 executes printing. In one embodiment, the information acquisition unit 901 acquires the type of paper to be printed from the printer 1005, and acquires information concerning the acquired type of paper from the paper information DB 1300 managed by the storage device 1008.

The image data generation unit 902 generates image data to be used to print the barcode 11 in the print region on the print medium. If a predetermined condition concerning reading of the barcode 11 is satisfied, the image data generation unit 902 generates image data of the barcode 11 of a size based on the information acquired by the information acquisition unit 901. Detailed processing will be described later.

A lower limit setting unit 903 sets the lower limit L of the width of each bar forming the barcode 11, which is used by the image data generation unit 902 to generate the image data of the barcode 11. In this embodiment, the lower limit L is set based on the user input accepted by the input device 1007.

Figure 6:
FIG. 6 is a view showing an example of the arrangement of a screen displayed on a monitor by a notification instruction unit.

A notification instruction unit 904 sends a notification instruction to the monitor 1006 serving as a notification unit that makes a notification to the user. For example, if the image data generated by the image data generation unit 902 does not satisfy a predetermined condition, the notification instruction unit 904 sends a notification instruction to the monitor 1006. FIG. 6 is a view showing an example of the arrangement of a screen displayed on the monitor 1006 by the notification instruction unit 904. Note that the target to which the notification instruction unit 904 sends a notification instruction is not limited to the monitor 1006, and the notification instruction unit 904 may send a voice output instruction to a loudspeaker or the like. Furthermore, in this embodiment, the notification instruction unit 904 sends an instruction to the monitor 1006 connected to the information processing apparatus 1004. However, if the information processing apparatus 1004 includes a monitor, a loudspeaker, and the like, a notification instruction may be issued in the information processing apparatus 1004.

An image data output unit 905 outputs the image data generated by the image data generation unit 902 to an output destination apparatus such as the printer 1005.

Note that the respective functional units of the application 90 shown in FIG. 2 are merely examples. Some of the functional units may be omitted or integrated in another functional unit.

Example of Arrangement of Barcode

Figure 7:
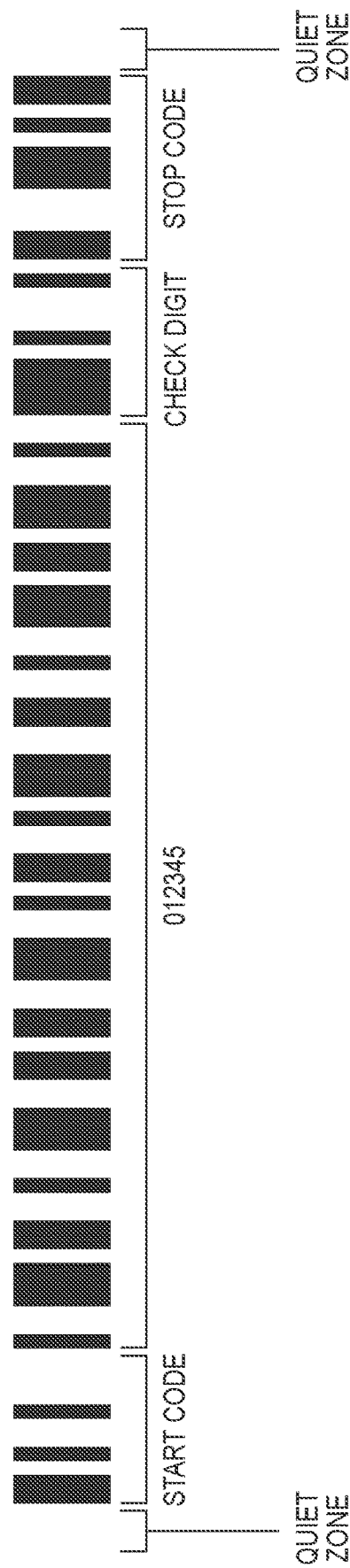
FIG. 7 is a view for explaining an example of the arrangement of the barcode.

An example of the arrangement of the barcode 11 will be described with reference to FIGS. 7 and 8. FIG. 7 is a view for explaining an example of the arrangement of the barcode 11. FIG. 8 is a view for explaining examples of barcode patterns. Note that there are various types of barcodes such as CODE 39 and CODE 128, and CODE 128 will be exemplified here.

If the type of the barcode 11 is CODE 128, the barcode 11 is formed by quiet zones at two ends in the width direction, and a start code, data representing a character string, a check digit, and a stop code between the quiet zones.

The quiet zones are blank margins provided before and after the barcode for the purpose of preventing a reading failure of the barcode. The width of each quiet zone may be set to a constant value or set based on the calculated width of one bar. The start code and the stop code indicate the beginning and end of data, respectively, and are portions serving as references when reading the barcode by the barcode reader. The check digit is a portion arranged immediately after the data representing the character string and used to confirm whether coded barcode data is correct.

The data represents the character string converted into the barcode. As shown in FIG. 8, each character forming the character string is represented by three bars (print portions) and three spaces (blanks). More specifically, 11-digit barcode patterns respectively corresponding to character codes are prepared as standards, and conversion is performed into bars (print portions) and spaces (blanks) of widths corresponding to the barcode patterns, thereby representing the character string. For example, the barcode pattern representing a character "0" is "10011101100", and conversion is performed into a barcode shown in an enlarged view of FIG. 8. Note that in this example, a numerical value "1" included in each barcode pattern indicates a print portion, and a numerical value "0" indicates a non-print portion, that is, a blank portion. As the number of "1"s continuously existing on the barcode pattern increases, the width of the bar also increases. As the number of "0" continuously existing increases, the interval between the bars also increases.

With respect to the start code and the stop code as well, barcode patterns are prepared as standards. For CODE 128, an 11-digit barcode pattern is set for the start code and a 13-digit barcode pattern is set for the stop code.

For example, for CODE 128, the check digit is calculated using Modulus 103. In calculation of Modulus 103, after each character is converted into a corresponding numerical value, the start code is integrated by 1, the subsequent characters are sequentially integrated by 1, 2, 3, ... from the next character, and the total of them is obtained, and divided by 103, thereby obtaining a remainder as a check digit. For example, if a character string to be converted into a barcode is "012345", "98" is calculated.

In this embodiment, when the start code includes 11 digits, the character string includes 6 characters×11 digits=66 digits, the check digit includes 11 digits, the stop code includes 13 digits, and each quiet zone includes, for example, 8 digits, the total number of digits of the barcode patterns is 117. When a width W of the print region of the barcode is divided by this value, it is possible to calculate the number of pixels in the width direction for one digit of the barcode patterns. For example, if the width W of the print region corresponds to 708 pixels, 6 is calculated as the number of pixels for one digit of the barcode patterns. The number of pixels for one digit corresponds to a minimum width B of each bar forming the barcode. That is, when the width W of the print region is divided by the total number of digits of the barcode patterns, the minimum width B of each bar is calculated. In the above example, "the minimum width B of each bar"="the number of pixels for one digit of the barcode patterns"=6 pixels is obtained.

Note that in this embodiment, since the number of pixels for one digit is obtained by dividing the width W of the print region by the number of digits of the barcode patterns, the width W of the print region corresponds to the entire width of the barcode. From another viewpoint, the width W and a height H of the print region correspond to the entire width and height of the barcode, respectively, and can correspond to information concerning the size of the barcode 11.

Example of Processing of Barcode Generation Application

Figure 3:
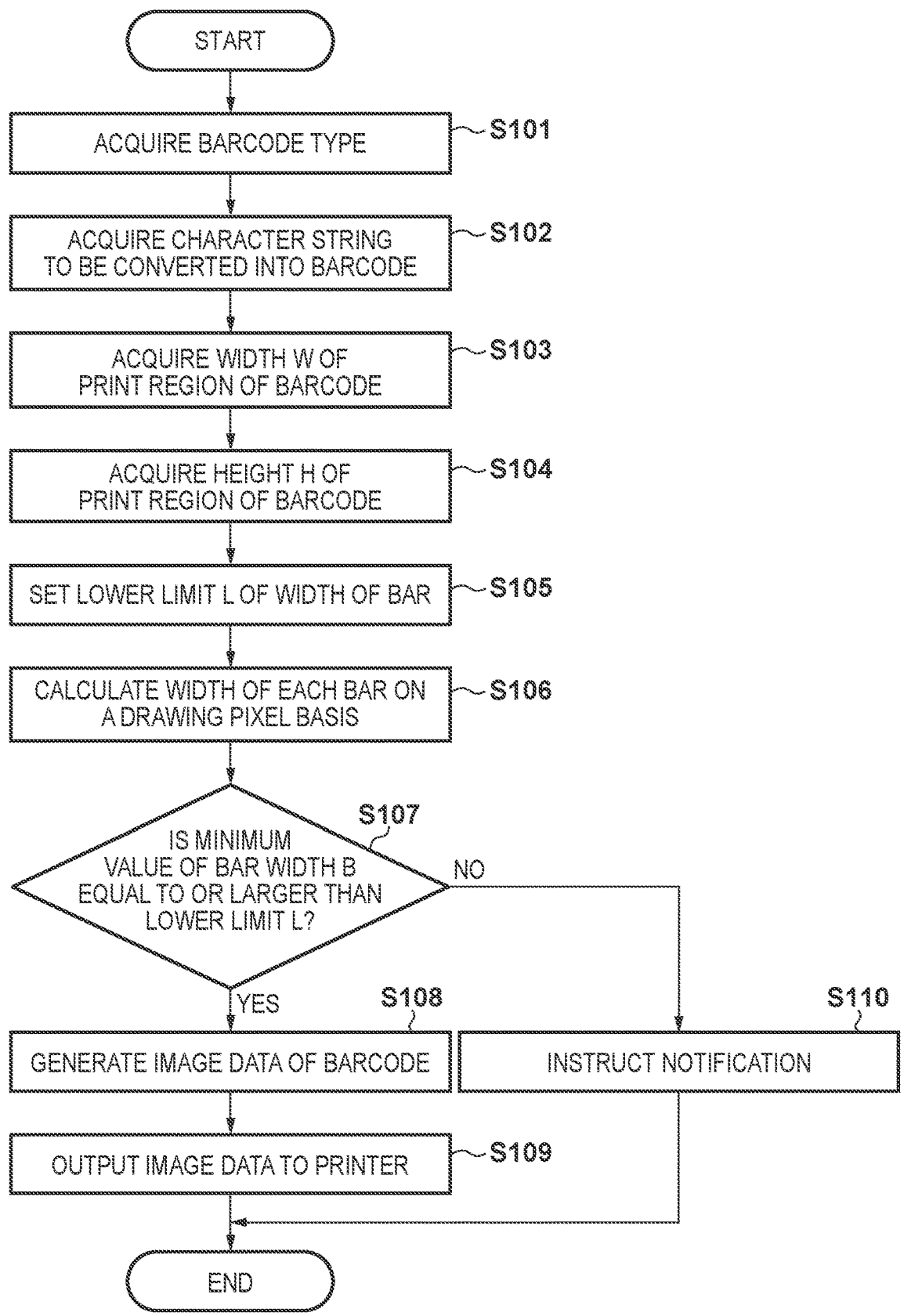
FIG. 3 is a flowchart illustrating an example of the processing of the barcode generation application.

FIG. 3 is a flowchart illustrating an example of processing of the application 90. For example, when the application 90 is activated in the information processing apparatus 1004, the processing of the flowchart shown in FIG. 3 starts. Note that each step of the flowchart according to this embodiment is implemented when the CPU 1011 reads out the program associated with the processing of the flowchart from the memory, and executes it.

In step S101, the information acquisition unit 901 acquires a barcode type. For example, the information acquisition unit 901 acquires a result of selecting a barcode type by receiving, from the input device 1007, the barcode type input by the user and accepted by the input device 1007. Examples of the barcode type are CODE 128 and CODE 39, as described above. Since a barcode generation logic is different depending on the selected barcode type, the application 90 performs the following corresponding processing based on the acquisition result in step S101. Note that an example when CODE 128 is selected will be described below.

In step S102, the information acquisition unit 901 acquires a character string to be converted into a barcode. For example, the information acquisition unit 901 acquires a character string to be converted into a barcode, by receiving, from the input device 1007, a result of inputting the character string by the user, which has been accepted by the input device 1007. The character string to be converted into the barcode can be a character string selected from characters corresponding to the barcode type, for example, "012345".

In step S103, the information acquisition unit 901 acquires the width W as width information indicating the width of the print region of the barcode. In step S104, the information acquisition unit 901 acquires the height H as height information indicating the height of the print region of the barcode. For example, the information acquisition unit 901 acquires the width W and height H of the print region by receiving, from the input device 1007, a result of selecting the width W and height H of the print region by the user, which has been accepted by the input device 1007.

Figure 4A:
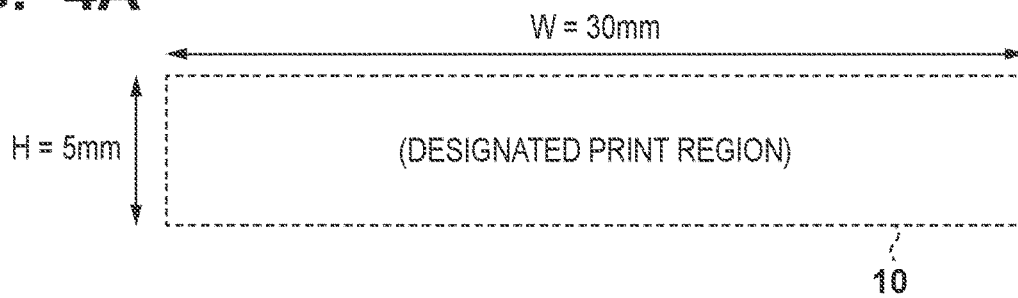
FIG. 4A is a view showing an example of a print region of a barcode.

FIG. 4A is a view showing an example of a print region 10 of the barcode 11. In the example shown in FIG. 4A, the width W=30 mm and the height H=5 mm are set. These values correspond to the width W=708 pixels and the height H=118 pixels, respectively, when, for example, the barcode 11 is drawn at 600 dpi. Note that initial values may be set for the width W and the height H. If the input device 1007 does not accept input of the width W and height H of the print region, the information acquisition unit 901 may acquire the initial values as the width W and height H of the print region. The exemplified drawing resolution of 600 dpi may be set as an initial value or an arbitrary value may be settable.

In step S105, the lower limit setting unit 903 sets the lower limit L of the width of each bar forming the barcode 11. For example, the information acquisition unit 901 receives, from the input device 1007, a result of inputting the lower limit L by the user, which has been accepted by the input device 1007, thereby setting the lower limit L. Note that an initial value may be set for the lower limit L of the bar width. If the input device 1007 does not accept the input of the lower limit L, the initial value may be set as the lower limit L. In one embodiment, the initial value of the lower limit L=2 pixels may be set. Note that a case in which the lower limit L=2 pixels is set will be described below.

In step S106, the image data generation unit 902 calculates the width of each bar forming the barcode 11 on a drawing pixel basis. As described with reference to FIG. 8, the bar width can be calculated based on the number of digits of the barcode patterns, information of the character string, and the width W of the print region of the barcode.

In step S107, the image data generation unit 902 determines whether the minimum width B of the bar widths calculated in step S106 is equal to or larger than the lower limit L (lower limit or more). If the minimum width B is equal to or larger than the lower limit L, the process advances to step S108; otherwise, the process advances to step S110.

Figure 4B:
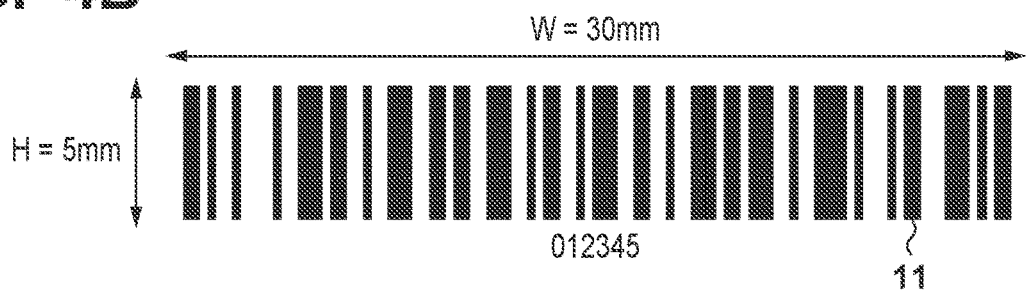
FIG. 4B is a view showing an example of a barcode printed by a printer based on image data generated by an image data generation unit.
Figure 5A:
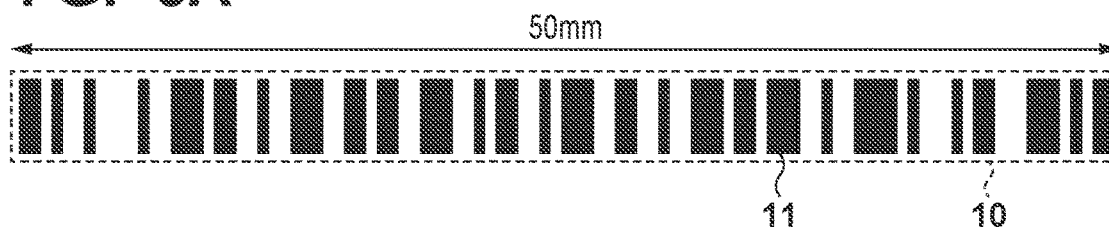
FIG. 5A is a view showing a print example when printing the barcode in a print region of a width different from those in FIGS. 5B, 5C, and 5D.
Figure 5B:
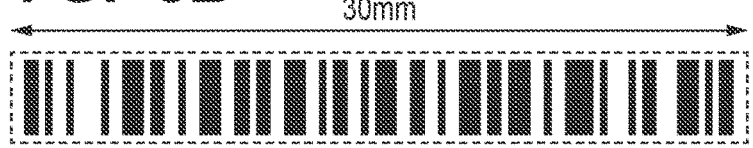
FIG. 5B is a view showing a print example when printing the barcode in a print region of a width different from those in FIGS. 5A, 5C, and 5D.
Figure 5C:
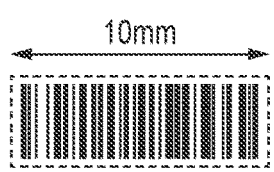
FIG. 5C is a view showing a print example when printing the barcode in a print region of a width different from those in FIGS. 5A, 5B, and 5D.
Figure 5D:
FIG. 5D is a view showing a print example when printing the barcode in a print region of a width different from those in FIGS. 5A, 5B, and 5C.

In step S108, the image data generation unit 902 generates image data of the barcode 11. That is, if, as a predetermined condition concerning reading of the barcode, a condition that the minimum width B is equal to or larger than the lower limit L is satisfied, the image data generation unit 902 generates image data of the barcode 11. For example, the image data generation unit 902 generates the barcode 11, as shown in FIG. 4B, based on the pieces of information acquired in steps S102, S103, and S104, the calculation result in step S106, and the like (S108). For example, the image data generation unit 902 generates image data of a barcode including bars each having the width based on the width information acquired in step S103 and the height based on the height information acquired in step S104.

In step S109, the image data output unit 905 outputs, to the printer 1005, the image data generated by the image data generation unit 902 in step S108. This allows the printer 1005, which has received the image data, to print the barcode 11 in the print region on the print medium based on the received image data. The printed barcode is used for processing of a subsequent step by the post-processing apparatus 1400 or the like.

According to a given aspect, it can be said that the image data output unit 905 currently performs print control of the printer 1005 to print the barcode 11 in the print region based on the image data generated by the image data generation unit 902. Furthermore, if, as a predetermined condition concerning reading of the barcode, a condition that the minimum width B of the bar widths calculated in step S106 is equal to or larger than the lower limit L is satisfied (YES in step S107), it can be said that the image data output unit 905 currently causes the printer 1005 to print the barcode 11.

The arrangement of the printed barcode whose image data has been generated by the above flowchart will be described below.

FIG. 4B is a view showing an example of the barcode 11 printed by the printer 1005 based on the image data generated by the image data generation unit 902. In this embodiment, the image data generation unit 902 generates the image data of the barcode having the same width and height as the width W and height H of the print region. In other words, in this embodiment, the image data generation unit 902 generates image data of the barcode having the maximum width and height falling within the width W of the print region.

On the other hand, in step S110, the notification instruction unit 904 sends a notification instruction to the monitor 1006 serving as a notification unit. For example, the notification instruction unit 904 instructs the monitor 1006 to display a screen shown in FIG. 6. Thus, if the bar width of the barcode is smaller than the lower limit L, the user can be notified of it without outputting the image data of the barcode to the printer.

FIGS. 5A to 5D show print examples when converting the same character string "012345" as in the example of FIG. 4B into barcodes with the different widths W of the print regions. More specifically, FIGS. 5A, 5B, 5C, and 5D show print examples of the barcodes when acquiring the widths W=50 mm, 30 mm, 10 mm, and 8 mm, respectively. In these cases, the minimum widths B calculated in step S106 are 11 pixels, 6 pixels, 2 pixels, and 1 pixel, respectively. In this example, since the lower limit L=2 pixels is set, "minimum width B≥lower limit L" is not satisfied in FIG. 5D (NO in step S107), and a warning message shown in FIG. 6 is displayed on the monitor 1006 without generating the image data of the barcode (S110).

Note that in the barcode reader 1500, the total number of digits of the data included in the barcode has been set. The barcode reader 1500 calculates a bar width corresponding to one digit by dividing the width W of the print region of the barcode by the total number of digits, and determines the data indicated by the barcode based on the calculated width. Therefore, if the numerical value "1" (print portion) continues in the barcode, the barcode reader 1500 can determine the number of digits of a numerical value corresponding to the print portion. Therefore, although the bar width corresponding to one digit is different in each of FIGS. 5A to 5C, the barcode reader 1500 can obtain the same data from FIGS. 5A to 5C. Furthermore, a method of calculating a bar width corresponding to one digit is not limited to the above-described one. For example, each of the start code and the stop code is predetermined information. Therefore, the barcode reader 1500 may calculate a bar width for one digit by comparing the first portion in the read barcode with the barcode pattern of the start code. Alternatively, the barcode reader 1500 may calculate a bar width for one digit by comparing the last portion in the read barcode with the barcode pattern of the stop code.

As described above, according to this embodiment, if the predetermined condition concerning reading of the barcode 11 is satisfied, the image data generation unit 902 generates image data of a barcode of a size based on the width and height of the print region as information concerning the size of the barcode. More specifically, if, as the predetermined condition, the minimum width B is equal to or larger than the lower limit L, the image data is generated. This prints the barcode in a desired size while maintaining the reading accuracy, and it is thus possible to print the barcode in an appropriate size.

Furthermore, in this embodiment, since a user input is accepted with respect to the width W and height H of the print region, it is possible to generate a barcode in an arbitrary size. In other words, even if the width W and height H of the print region corresponding to the size of the barcode are set individually, it is possible to generate the barcode in the set size. In this embodiment, by drawing the barcode with the maximum width falling within the print region, it is possible to increase bars (print portions) and spaces (blanks) as much as possible, thereby improving the reading accuracy of the barcode reader 1500.

Note that the acquisition order of the various kinds of information by the information acquisition unit 901 can be changed appropriately. In addition, the information acquisition unit 901 may collectively receive, from the input device 1007, the pieces of information to be acquired.

Second Embodiment

An arrangement according to the second embodiment will be described. Note that the same reference numerals as in the first embodiment denote similar components and a description thereof will be omitted. The second embodiment is different from the first embodiment in terms of processing performed when a minimum width B of each bar forming a barcode is smaller than a lower limit L.

Figure 9:
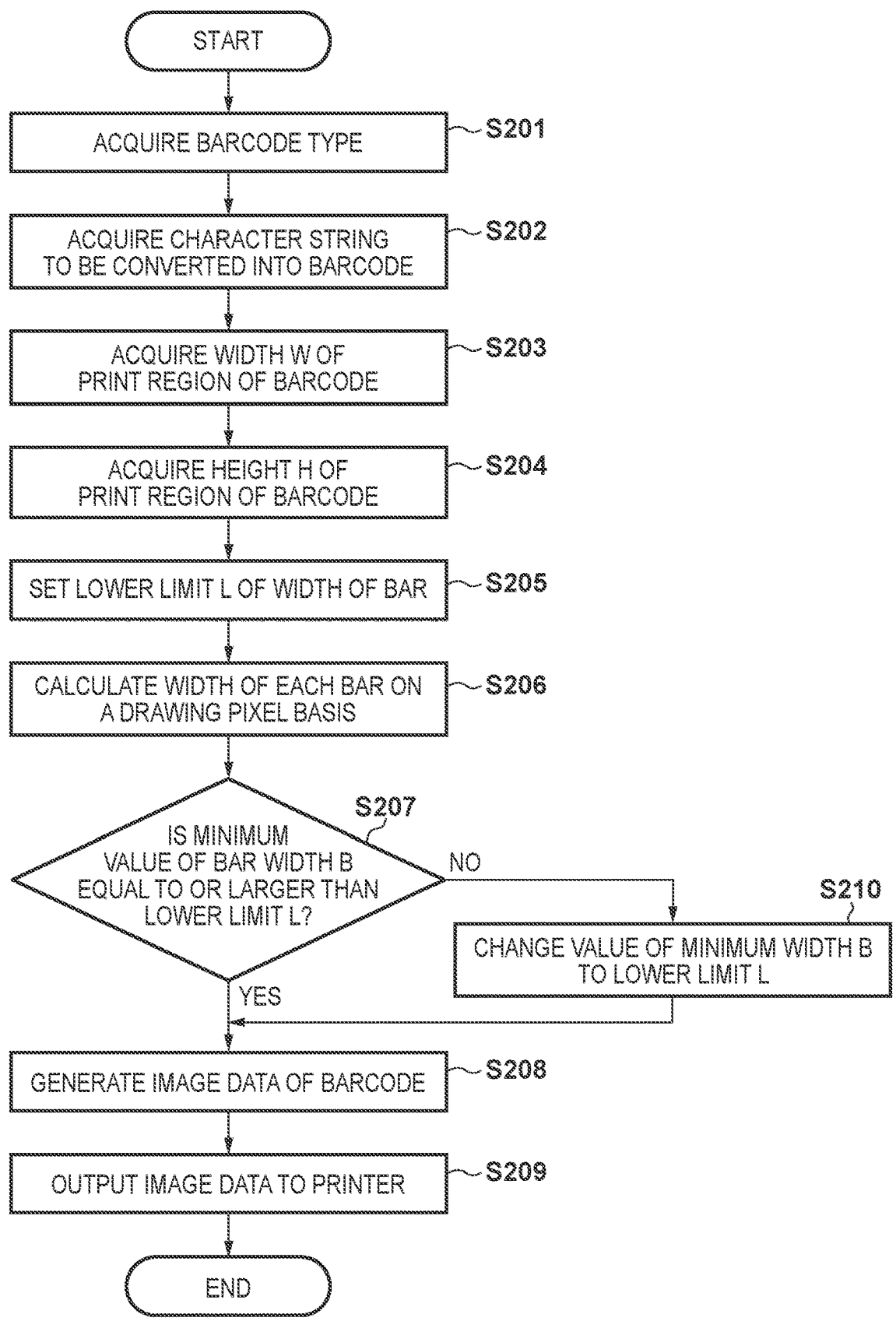
FIG. 9 is a flowchart illustrating an example of processing of a barcode generation application.

FIG. 9 is a flowchart illustrating an example of processing of an application 90 according to the embodiment. Processes in steps S201 to S209 are the same as those in steps S101 to S109 of FIG. 3, respectively.

If the process advances to step S210, that is, if the minimum width B is smaller than the lower limit L, an image data generation unit 902 changes the value of the minimum width B to the value of the lower limit L. In other words, the lower limit L is substituted into the minimum width B. The image data generation unit 902 then advances to the processing in step S209 to generate image data. That is, even if the minimum width B is smaller than the lower limit L, the image data generation unit 902 changes the value of the minimum width B to the value of the lower limit L and generates image data of a barcode with the readable minimum bar width L, instead of aborting generation of the image data.

Figure 10A:
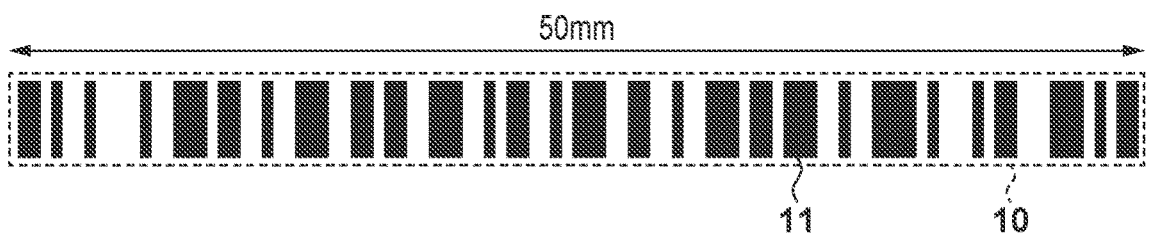
FIG. 10A is a view showing a print example when printing a barcode in a print region of a width different from those in FIGS. 10B, 10C, and 10D.
Figure 10B:
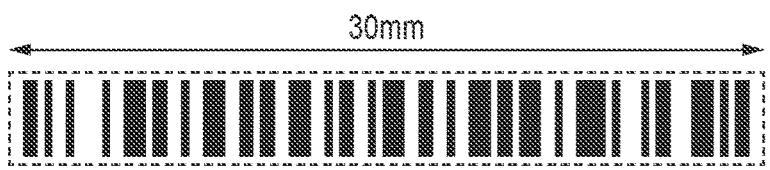
FIG. 10B is a view showing a print example when printing the barcode in a print region of a width different from those in FIGS. 10A, 10C, and 10D.
Figure 10C:
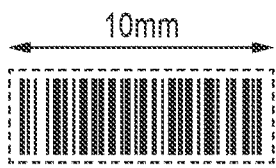
FIG. 10C is a view showing a print example when printing the barcode in a print region of a width different from those in FIGS. 10A, 10B, and 10D.
Figure 10D:
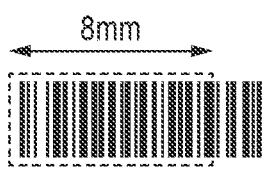
FIG. 10D is a view showing a print example when printing the barcode in a print region of a width different from those in FIGS. 10A, 10B, and 10C.

FIG. 10D is a view showing an example of a result of printing the barcode when the image data is generated after the processing in step S210. A case in which the width W of the print region acquired in step S203 is 8 mm, the minimum width B calculated in step S206 is 1 pixel, and the lower limit L set in step S205 is 2 pixels will now be described. In this case, since "minimum width B<lower limit L" is satisfied, the image data generation unit 902 advances from step S207 to step S208. In step S208, the image data generation unit 902 changes the minimum width B from 1 pixel to 2 pixels. As described above, since the minimum width B corresponds to the number of pixels for one digit of the barcode patterns, the number of pixels for one digit of the barcode patterns is also changed from 1 pixel to 2 pixels in accordance with the change. Therefore, the entire width of the barcode becomes larger than that before the change. Therefore, as shown in FIG. 10D, the barcode extended in the width direction to the outside of the range of the designated print region is printed. This generates the barcode outside the designated print region without displaying any warning message.

According to this embodiment, for a printed product having a margin in the print region in the width direction, it is possible to efficiently print the barcode by enlarging the barcode in the width direction to the extent that the reading accuracy can be ensured without making a notification to the user.

When the initial value is set for the width W of the barcode print region, if the number of characters of an input character string is large, the minimum width B becomes small, and the condition of "minimum width B≥lower limit L" may hardly be satisfied. However, according to this embodiment, in this case, generation of a barcode can be prioritized without making a notification to the user unlike the first embodiment.

Note that if interference with another print target is caused when the barcode is printed outside the designated print region, a notification instruction unit 904 may display a warning message on a monitor 1006 or the like.

Third Embodiment

The third embodiment will be described next with reference to FIGS. 11 and 12A to 12D. Note that the same reference numerals as in the first embodiment denote similar components and a description thereof will be omitted. The third embodiment is different from the first embodiment in that a barcode is generated based on the font size of the barcode. In the first embodiment, a barcode is generated by calculating the width of each bar based on the width W of the print region. On the other hand, in the third embodiment, the entire width of the barcode is set using the point setting of a barcode font, and a barcode is generated so as not to print a portion protruding from a print region in the height direction.

Figure 11:
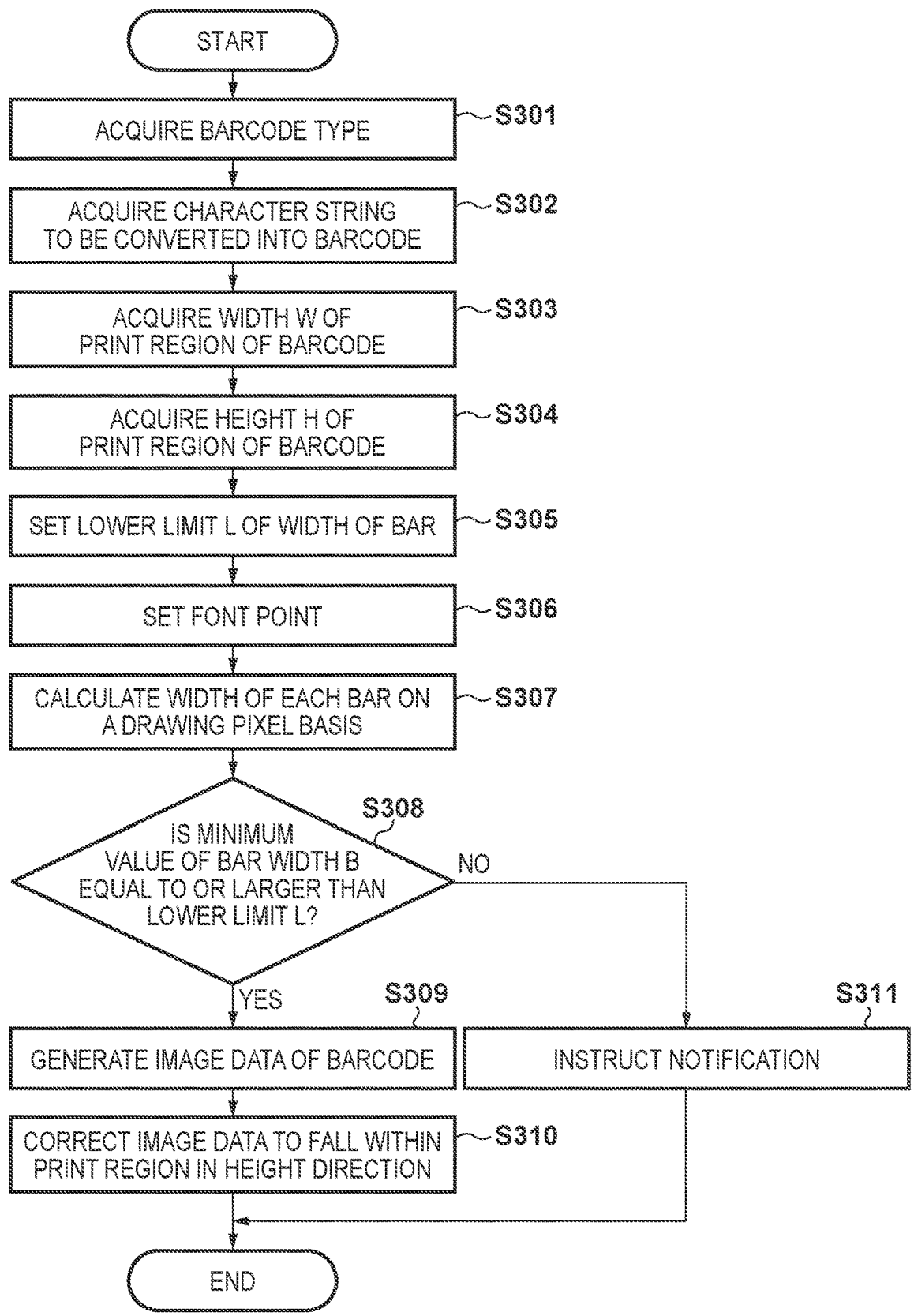
FIG. 11 is a flowchart illustrating an example of processing of a barcode generation application.

FIG. 11 is a flowchart illustrating an example of processing of an application 90 according to the embodiment. Steps S301 to S305 are the same as steps S101 to S105, respectively.

In step S306, an image data generation unit 902 sets the font point size of a barcode. More specifically, the image data generation unit 902 sets, as the font point size, the maximum value of the barcode font point sizes with which the printed barcode falls within a width W of the print region.

In step S307, the image data generation unit 902 calculates the width of each bar forming a barcode 11 on a drawing pixel basis based on the font point size set in step S306.

In step S308, the image data generation unit 902 determines whether a minimum width B of the bar widths calculated in step S307 is equal to or larger than a lower limit L. If the minimum width B is equal to or larger than the lower limit L, the process advances to step S309; otherwise, the process advances to step S311. Note that step S311 is the same as step S110.

In step S309, the image data generation unit 902 generates image data of the barcode 11.

In step S310, the image data generation unit 902 corrects the image data so that the barcode 11 printed based on the image data falls within the print region in the height direction. The barcode 11 printed based on the image data generated in step S309 falls within the print region in the width direction by the processing in step S306 but may or may not fall within the print region in the height direction. To cope with this, if the barcode printed based on the image data falls outside the print region in the height direction, the image data generation unit 902 corrects the image data so a portion falling outside the print region is not printed.

As a method of correcting the image data, a method of overcoating, with white, the portion, falling outside the print region, of the image data is used. For example, if the image data is in a bitmap format, correction of changing the portion falling outside the print region to a value (for example, 0) corresponding to white may be performed. As a correction method, the size of the image data in the height direction is changed so that the image data falls within the print region. For example, correction of changing the number of pixels in the height direction so that the barcode falls within the print region may be performed. Note that if the barcode printed based on the image data falls within the print region without performing correction, step S310 may be skipped.

Figure 12A:
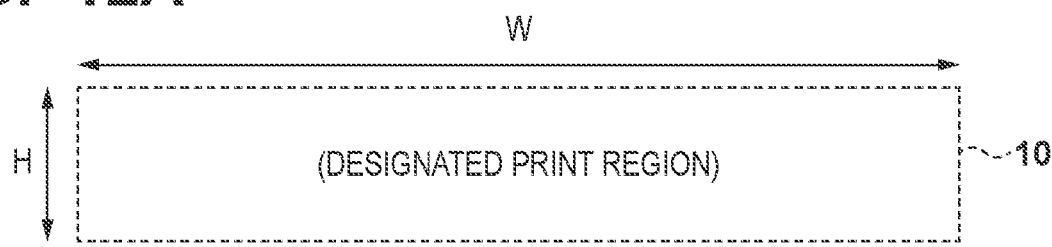
FIG. 12A is an explanatory view when printing a barcode based on a font point size.
Figure 12B:
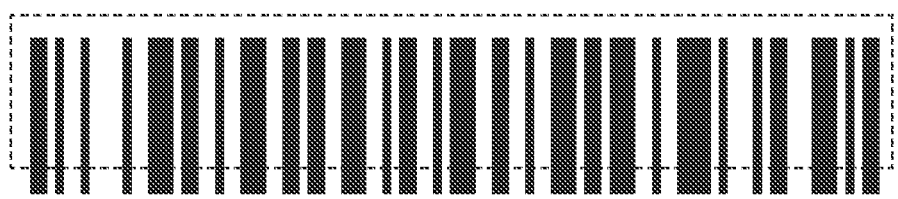
FIG. 12B is an explanatory view when printing the barcode based on the font point size.
Figure 12C:
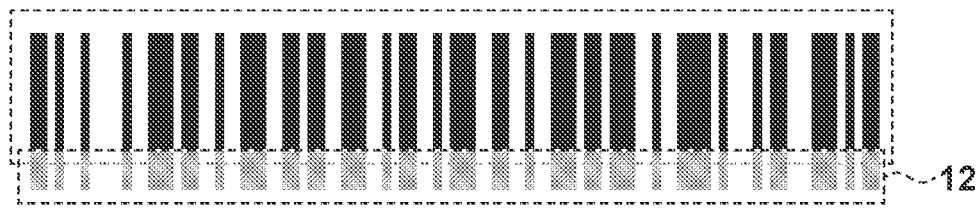
FIG. 12C is an explanatory view when printing the barcode based on the font point size.
Figure 12D:
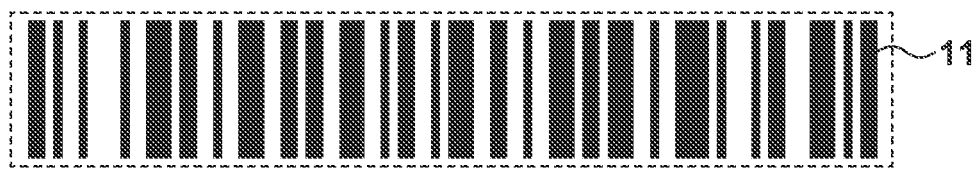
FIG. 12D is an explanatory view when printing the barcode based on the font point size.

FIGS. 12A to 12D are explanatory views when printing the barcode based on the font point size. When the font point size according to the width W of the designated print region shown in FIG. 12A is set (S306), if the image data of the barcode is generated and printed intact, the barcode may fall outside the designated print region in the height direction (FIG. 12B). In this embodiment, the image data is corrected so the portion falling outside the print region is not printed (S310). More specifically, the image data is corrected so as not to actually print a region 12 shown in FIG. 12C. Thus, a printer 1005 finally prints the barcode 11 falling within the designated print region.

As described above, according to this embodiment, it is possible to generate image data based on the barcode point setting determined by the standard or the like. Therefore, it is unnecessary to calculate the width of each bar of the barcode every time the user sets the size of the print region in the width direction, thereby making it possible to perform barcode generation processing more efficiently.

Fourth Embodiment

The fourth embodiment will be described next with reference to FIGS. 13 to 15. Note that the same reference numerals as in the first embodiment denote similar components and a description thereof will be omitted. The fourth embodiment is different from the first embodiment in that a lower limit L is set based on the resolution of a printer that prints a barcode and the resolution of a barcode reader that reads a barcode.

Figure 13:
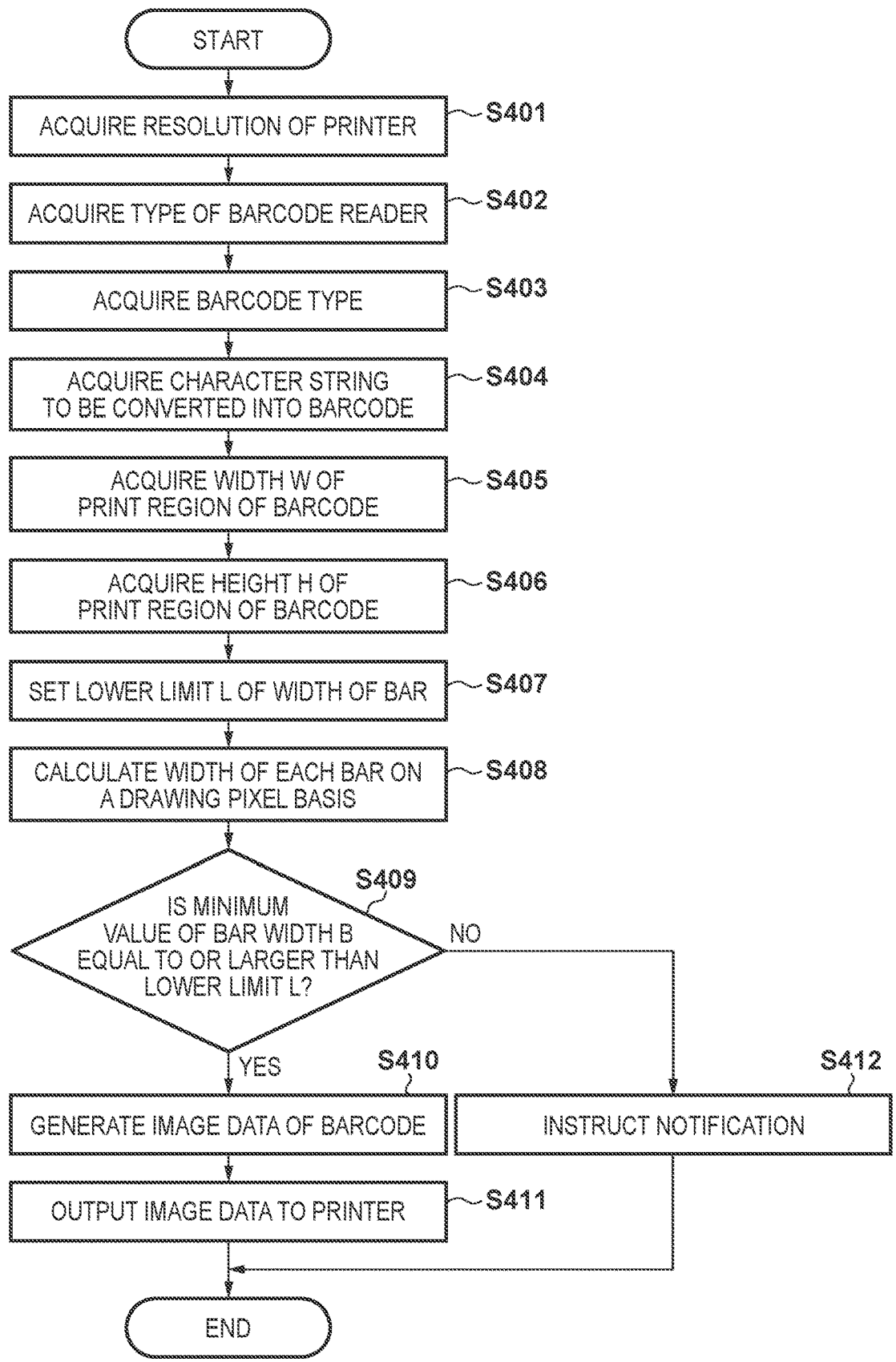
FIG. 13 is a flowchart illustrating an example of processing of a barcode generation application.

FIG. 13 is a flowchart illustrating an example of processing of an application 90.

In step S401, an information acquisition unit 901 acquires the resolution of a printer 1005 as the output destination of image data. For example, the application 90 may acquire information of the type of the printer 1005 input by the user via an input device 1007, and acquire information of the resolution of the type of the printer 1005 as a target with reference to a barcode reader information DB 1200 based on the acquired type. Furthermore, for example, the application 90 may acquire resolution setting information by communicating with the printer 1005. In addition, for example, the application 90 may accept input of the resolution setting information by the user via the input device 1007.

In step S402, the information acquisition unit 901 acquires the type of a barcode reader 1500 to be used. For example, the information acquisition unit 901 acquires, via the input device 1007, information of the type of the barcode reader 1500 to be used. The information acquisition unit 901 may acquire the resolution of the barcode reader 1500 as a target with reference to the barcode reader information DB 1200 based on the acquired type of the barcode reader 1500. That is, the information acquisition unit 901 acquires the type of the barcode reader 1500 to acquire the resolution of the barcode reader 1500 linked with the acquired type. Note that the information acquisition unit 901 may acquire resolution setting information by communicating with a post-processing apparatus 1400. Furthermore, the application 90 may accept input of resolution setting information by the user via the input device 1007.

Steps S403 to S406 are the same as steps S101 to S104, respectively.

In step S407, a lower limit setting unit 903 sets the lower limit L of the width of each bar forming the barcode. In this embodiment, the lower limit setting unit 903 sets the lower limit L of the bar width based on the resolution of the printer and the resolution of the barcode reader respectively set in steps S401 and S402. For example, the lower limit setting unit 903 sets the lower limit L in consideration of the resolution of the printer 1005 and the resolution (or type) of the barcode reader 1500 from the list of the barcode reader information DB 1200 exemplified in FIG. 15. Note that the lower limit setting unit 903 may set the lower limit L from the acquired resolution of the printer 1005 and the acquired resolution of the barcode reader 1500 based on a predetermined formula.

Note that the lower limit L may be set in consideration of information about a print medium in addition to the resolution of the printer 1005 and the resolution of the barcode reader 1500. For example, the lower limit setting unit 903 may acquire the lower limit L with reference to a paper information DB 1300 shown as a list in FIG. 16 based on a type of paper and a barcode font with which the printer 1005 executes printing. Then, the lower limit setting unit 903 may set, as the lower limit L, a larger one of the lower limit acquired with reference to the barcode reader information DB 1200 and that acquired with reference to the paper information DB.

Steps S408 to S412 are the same as steps S106 to S110, respectively.

As described above, in this embodiment, the lower limit L of the bar width can be set based on the printer and barcode reader to be used. This can suppress a reading failure of a barcode, thereby improving the reading accuracy of the barcode by the barcode reader.

Other Embodiments

The application 90 may execute the processes of the above embodiments in combination appropriately. For example, processes to be executed may be selectable by a user operation, or some of the series of processes may be replaced by processing according to another embodiment. For example, the processing performed when "minimum width B<lower limit L" is satisfied may be switched based on the various kinds of information acquired by the information acquisition unit 901.

Furthermore, the above embodiments assume that the barcode generation application 90 executes each process. The present invention, however, is not limited to this. For example, the processes of the above embodiments may be executed using a layout edit application that newly arranges object data.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-033748, filed Feb. 28, 2020, which is hereby incorporated by reference herein in its entirety.

What is claimed is:

1. An information processing apparatus comprising:
   a memory containing instructions; and
   at least one processor for executing the instructions to operate as:
   a first acquisition unit to acquire first information concerning a size of a print region where a barcode is printed;
   a generation unit to generate, based on the first information acquired by the first acquisition unit, image data of the barcode to be printed in the print region;
   a print control unit configured to cause a printer to print the barcode in the print region based on the image data generated by the generation unit; and
   a first setting unit to set a lower limit of the width of each bar forming the barcode,
   wherein the first information includes width information concerning a width of the print region and height information concerning a height of the print region,
   the generation unit generates the image data including, as a bar forming the barcode, a bar having a width based on the width information and a height based on the height information,
   the generation unit determines whether a minimum width of the bar of the barcode to be printed, calculated based on the first information acquired by the first acquisition unit, is equal to or larger than the lower limit set by the first setting unit,
   the generation unit generates the image data if a minimum width of each bar forming the barcode is equal to or larger than the lower limit set by the first setting unit, and
   if the minimum width is determined to be equal to or larger than the lower limit, the print control unit causes the printer to print the barcode, and if the minimum width is determined to be smaller than the lower limit, the print control unit does not cause the printer to print the barcode.

2. The apparatus according to claim 1, wherein the first information includes information concerning an entire width and an entire height of the barcode which have been set individually.

3. The apparatus according to claim 1, wherein the generation unit generates the image data so that an entire width and an entire height of the barcode are maximum values within a range in which the barcode falls within the print region.

4. The apparatus according to claim 1, wherein if a predetermined condition concerning reading of the barcode is satisfied, the print control unit causes the printer to print the barcode.

5. The apparatus according to claim 1, further comprising a notification unit to notify an user if the minimum width is determined to be smaller than the lower limit.

6. The apparatus according to claim 1 wherein if, when the image data is generated with an entire width of the barcode corresponding to the size of the print region, the minimum width of the bar forming the barcode to be printed based on the image data is smaller than the lower limit set by the first setting unit, the generation unit generates the image data by changing the minimum width of the bar to the lower limit.

7. The apparatus according to claim 1, wherein the first setting unit sets the lower limit based on a resolution of a print apparatus configured to execute printing based on the image data and a resolution of a reading apparatus that reads the barcode printed by the print apparatus.

8. The apparatus according to claim 1, wherein the first setting unit sets the lower limit based on a user input accepted by an input device configured to accept the user input.

9. The apparatus according to claim 1, wherein the instructions are further executed to operate as a second setting unit to set a font size of the barcode corresponding to the width of the print region,
   wherein when the image data is generated based on the font size set by the second setting unit, if the barcode printed based on the image data does not fall within the print region in a height direction, the generation unit further corrects the generated image data so that a portion falling outside the print region is not printed.

10. A print system comprising:
    a memory containing instructions; and
    at least one processor for executing the instructions to operate as:
    a first acquisition unit to acquire first information concerning a size of a print region where a barcode is printed;
    a generation unit to generate, based on the first information acquired by the first acquisition unit, image data of the barcode to be printed in the print region; and
    a first setting unit to set a lower limit of the width of each bar forming the barcode; and
    a printer to execute printing based on the image data generated by the generation unit, and
    wherein the first information includes width information concerning a width of the print region and height information concerning a height of the print region,
    the generation unit generates the image data including, as a bar forming the barcode, a bar having a width based on the width information and a height based on the height information,
    the generation unit determines whether a minimum width of the bar of the barcode to be printed, calculated based on the first information acquired by the first acquisition unit, is equal to or larger than the lower limit set by the first setting unit, the generation unit generates the image data if a minimum width of each bar forming the barcode is equal to or larger than the lower limit set by the first setting unit, and if the minimum width is determined to be equal to or larger than the lower limit, the print control unit causes the printer to print the barcode, and if the minimum width is determined to be smaller than the lower limit, the print control unit does not cause the printer to print the barcode.

11. An information processing method comprising:

acquiring first information concerning a size of a print region where a barcode is printed;

generating, based on the acquired first information, image data of the barcode to be printed in the print region; and causing a printer to print the barcode in the print region based on the image data generated by the generation unit; and setting a lower limit of the width of each bar forming the barcode, wherein the first information includes width information concerning a width of the print region and height information concerning a height of the print region, the generated image data including, as a bar forming the barcode, a bar having a width based on the width information and a height based on the height information is generated, a determination is made as to whether a minimum width of the bar of the barcode to be printed, calculated based on the first information acquired by the first acquisition unit, is equal to or larger than the lower limit set by the first setting unit, the image data is generated if a minimum width of each bar forming the barcode is equal to or larger than the set lower limit set, and if the minimum width is determined to be equal to or larger than the lower limit, the printer is caused to print the barcode, and if the minimum width is determined to be smaller than the lower limit, the printer is not caused to print the barcode.

\* \* \* \* \*